(12) United States Patent
Shamilian et al.

(10) Patent No.: US 9,304,824 B1
(45) Date of Patent: *Apr. 5, 2016

(54) METHOD AND APPARATUS FOR PROVIDING ISOLATED VIRTUAL SPACE

(71) Applicant: Alcatel Lucent, Boulogne Billancourt (FR)

(72) Inventors: John H. Shamilian, Tinton Falls, NJ (US); Thomas L. Wood, Colts Neck, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/507,968

(22) Filed: Oct. 7, 2014

Related U.S. Application Data

(62) Division of application No. 13/232,006, filed on Sep. 14, 2011, now Pat. No. 8,898,672.

(51) Int. Cl.
*G06F 9/46* (2006.01)
*G06F 9/50* (2006.01)

(52) U.S. Cl.
CPC ............ *G06F 9/5027* (2013.01); *G06F 9/5016* (2013.01); *G06F 9/5077* (2013.01)

(58) Field of Classification Search
None
See application file for complete search history.

(56) References Cited

U.S. PATENT DOCUMENTS

| | | | |
|---|---|---|---|
| 6,065,019 A | 5/2000 | Ault et al. | |
| 6,711,605 B2 | 3/2004 | Sekiguchi et al. | |
| 6,772,419 B1 | 8/2004 | Sekiguchi et al. | |
| 7,467,158 B2 | 12/2008 | Marinescu | |
| 7,712,104 B2 | 5/2010 | Sekiguchi et al. | |
| 7,954,150 B2 | 5/2011 | Croft et al. | |
| 8,230,122 B2 | 7/2012 | Filali-Adib et al. | |
| 8,341,270 B2 | 12/2012 | Mazaferri et al. | |
| 8,352,964 B2 | 1/2013 | Laborczfalvi et al. | |
| 8,448,169 B2 | 5/2013 | Filali-Adib et al. | |
| 8,527,989 B2 | 9/2013 | Filali-Adib et al. | |

(Continued)

FOREIGN PATENT DOCUMENTS

WO PCT/US2012/051966 1/2013

OTHER PUBLICATIONS

Sunay Tripathi, Nicolas Droux, Kais Belgaied, Shrikrishna Khare; "Crossbow Virtual Wire: Network in a Box", Proceedings of the 23rd Large Installation System Administration Conference (LISA '09), Nov. 5, 2009, Nov. 6, 2009, pp. 1-17, XP002688470, Retrieved from the Internet: URL:http://static.usenix.org/events/lisa09/tech/full_papers/tripathi.pdf [retrieved on Dec. 3, 2012].

(Continued)

*Primary Examiner* — Van Nguyen
(74) *Attorney, Agent, or Firm* — Carl Bilicska

(57) ABSTRACT

Various embodiments provide a method and apparatus of creating an application isolated virtual space without the need to run multiple OSs. Application isolated virtual spaces are created by an Operating System (OS) utilizing a resource manager. The resource manager isolates applications from each other by re-writing the network stack and the I/O subsystem of the conventional OS kernel to have multiple isolated network stack/virtual I/O views of the physical resources managed by the OS. Isolated network stacks and virtual I/O views identify the resources allocated to an application's isolated virtual space and are mapped to applications via an isolating identifier.

10 Claims, 8 Drawing Sheets

(56) References Cited

U.S. PATENT DOCUMENTS

| | | |
|---|---|---|
| 8,539,137 B1 | 9/2013 | Protassov et al. |
| 2006/0282461 A1 | 12/2006 | Marinescu |
| 2007/0106986 A1 | 5/2007 | Worley |
| 2007/0198714 A1 | 8/2007 | Faden |
| 2010/0031325 A1 | 2/2010 | Maigne et al. |
| 2010/0333189 A1 | 12/2010 | Droux et al. |

OTHER PUBLICATIONS

Daniel Price, Andrew Tucker: "Soiaris Zones: Operating System Support for Consolidating Commercial Workloads", Proceedings of the 18th Large Installation System Administration Conference, Nov. 14, 2004, Nov. 19, 2004, pp. 243-256, XP002688471, Retrieved from the Internet: URL:http://static.usenix.org/publications/library/proceedings/lisa04/tech/full_papers/price/price.pdf [retrieved on Dec. 3, 2012].

Marko Zec, "Implementing a Clonable Network Stack in the FreeBSD Kernel," Appeared in Proceedings of the 2003 USENIX Annual Technical Conference, http://www.usenix.org/events/usenix03/, pp. 1-14, University of Zagreb, Faculty of Electrical Engineering and Computing.

Getcwd( ) Function. The Open Group Base Specifications Issue 6, IEEE Std 1003.1, 2004 Edition. Copyright © 2001-2004 The IEEE and The Open Group. All Rights reserved. Availible on-line at http://pubs.opengroup.org/onlinepubs/009695399/.

Getgid( ) Function, The Linux Programming Interface. Availible on-line at http://books.codemotes.com/man-linux/man2/getgid.2.html.

Malloc( ) Function, The Open Group Base Specifications Issue 6, IEEE Std 1003.1, 2004 Edition, Copyright © 2001-2004 The IEEE and The Open Group, All Rights reserved. Available on-line at http://pubs.opengroup.org/onlinepubs/009695399.

Name malloc - a memory allocator

Synopsis include <stdlib.h>
char *malloc(size_t size);

Description

The malloc() function shall allocate unused space for an object whose size in bytes is specified by size and whose value is unspecified.
The order and contiguity of storage allocated by successive calls to malloc() is unspecified. ...

Return Value

Upon successful completion with size not equal to 0, malloc() shall return a pointer to the allocated space. If size is 0, either a null pointer or a unique pointer that can be successfully passed to free() shall be returned. Otherwise, it shall return a null pointer [CX] and set errno to indicate the error.

Errors

The malloc() function shall fail if:
[ENOMEM] Insufficient storage space is available.

*FIG. 3*

Name
Getgid, getegid - get group identity

Synopsis
include <unistd.h>
include <sys/types.h>
gid_t getgid(void);
gid_t getegid(void);

Description
getgid() returns the real group ID of the calling process.
getegid() returns the effective group ID of the calling process

Return Value
The real or effective group ID of the calling process.

Errors
These functions are always successful.

*FIG. 4*

Name getcwd - Get current working directory

Synopsis include <unistd.h>
char *getcwd(char *buf, size_t size)

Description

The getcwd() function shall place an absolute pathname of the current working directory in the array pointed to by buf, and return buf. The pathname copied to the array shall contain no components that are symbolic links. The size argument is the size in bytes of the character array pointed to by the buf argument. If buf is a null pointer, the behavior of getcwd() is unspecified.

Return Value

Upon successful completion, getcwd() shall return the buf argument. Otherwise, getcwd() shall return a null pointer and set errno to indicate the error. The contents of the array pointed to by buf are then undefined

*FIG. 5*

METHOD AND APPARATUS FOR PROVIDING ISOLATED VIRTUAL SPACE

This application is a divisional of U.S. Pat. No. 8,898,672B2, filed by John Shamilian et al., on Sep. 14, 2011.

TECHNICAL FIELD

The invention relates generally to methods and apparatus for creating an isolated virtual private server.

BACKGROUND

This section introduces aspects that may be helpful in facilitating a better understanding of the inventions. Accordingly, the statements of this section are to be read in this light and are not to be understood as admissions about what is in the prior art or what is not in the prior art.

There are numerous techniques allowing a host environment to dynamically assign resources of a physical server to create a virtual private server. In some known systems, the physical server runs a virtual machine manager which is tasked with creating, releasing, and managing the resources of "guest" operating systems (OSs), or virtual machines.

SUMMARY

Various embodiments provide a method and apparatus of creating an application isolated virtual space without the need to run multiple OSs. Application isolated virtual spaces are created by an Operating System (OS) utilizing a resource manager. The resource manager isolates applications from each other by re-writing the network stack and the I/O subsystem of the conventional OS kernel to have multiple isolated network stack/virtual I/O views of the physical resources managed by the OS. Isolated network stacks and virtual I/O views identify the resources allocated to an application's isolated virtual space and are mapped to applications via an isolating identifier. Advantageously, a method and apparatus is created that provides an application with an isolated operating environment without the need to run multiple OSs.

In one embodiment, a method is provided for creating a resource manager. The method includes creating a management level OS in digital data storage, monitoring application requests for application isolated virtual space, and granting a number of application requests for application isolated virtual space. The granting of an application request includes determining an isolating identifier for the application isolated virtual space, updating the management level OS based on the isolating identifier, and creating an application network stack in digital data storage.

In some embodiments, the updating of the management level OS includes updating at least one common resource scheduler.

In some embodiments, the updating of the management level OS includes updating at least one memory common resource allocator In some embodiments, the updating of the management level OS includes updating at least one resource table.

In another embodiment, a method is provided for serving a system call request in an application isolated virtual space. The method includes receiving a system call request, retrieving an isolating identifier, and utilizing an application resource to satisfy the system call request based on the isolating identifier.

In some embodiments, the system call request calls a modified system call.

In some embodiments, the method includes creating the modified system call from a system call.

In some embodiments, the modified system call accesses a virtual disk I/O view.

In some embodiments, the modified system call accesses a shared memory.

In another embodiment, an apparatus is provided for managing system resources. The apparatus includes a digital data storage, the digital data storage including at least one storage device and at least one memory device. The apparatus also includes at least one network interface and at least one processor. The processor(s) are programmed to: create a management level OS in the digital data storage, monitor application requests for application isolated virtual space, and grant a plurality of application requests for application isolated virtual space. The grant of a request includes: a determination of an isolating identifier for the application isolated virtual space, update of the management level OS based on the isolating identifier, and creation of an application network stack in the digital data storage.

In some embodiments, the update of the management level OS also includes an update of at least one common resource scheduler.

In some embodiments, the one common resource scheduler controls access to the at least one processor based on the isolating identifiers.

In some embodiments, the update of the management level OS includes update of at least one memory common resource allocator.

In some embodiments, the update of the management level OS includes update of at least one resource table.

In another embodiment, an apparatus is provided for serving system calls. The apparatus includes a digital data storage, the digital data storage including at least one storage device and at least one memory device, at least one network interface, and at least one processor. The processor is programmed to receive a system call request, retrieve an isolating identifier, and utilize an application resource to satisfy the system call request based on the isolating identifier.

In some embodiments, the system call request calls a modified system call.

In some embodiments, the at least one processor is programmed to create the modified system call from a system call.

In some embodiments, the modified system call accesses a virtual disk I/O view.

In some embodiments, the modified system call accesses a shared memory.

In another embodiment, a digital data storage medium is provided for creating a resource manager. The medium includes programs for creating a management level OS in digital data storage, monitoring application requests for application isolated virtual space, and granting a number of application requests for application isolated virtual space. The granting of an application request includes determining an isolating identifier for the application isolated virtual space, updating the management level OS based on the isolating identifier, and creating an application network stack in digital data storage.

BRIEF DESCRIPTION OF THE DRAWINGS

Various embodiments are illustrated in the accompanying drawings, in which:

FIG. 3 depicts an exemplary system call;

FIG. 4 depicts an exemplary system call;

FIG. 5 depicts an exemplary system call;

To facilitate understanding, identical reference numerals have been used to designate elements having substantially the same or similar structure and/or substantially the same or similar function.

DETAILED DESCRIPTION OF ILLUSTRATIVE EMBODIMENTS

Application isolated virtual spaces are created by an Operating System (OS) utilizing a resource manager. The resource manager isolates applications from each other by re-writing the network stack and the I/O subsystem of the conventional OS kernel to have multiple isolated network stack views and/or virtual I/O views of the physical resources managed by the OS. Isolated network stacks and virtual I/O views identify the resources allocated to an application's isolated virtual space and are mapped to applications via an isolating identifier.

Figure 1:
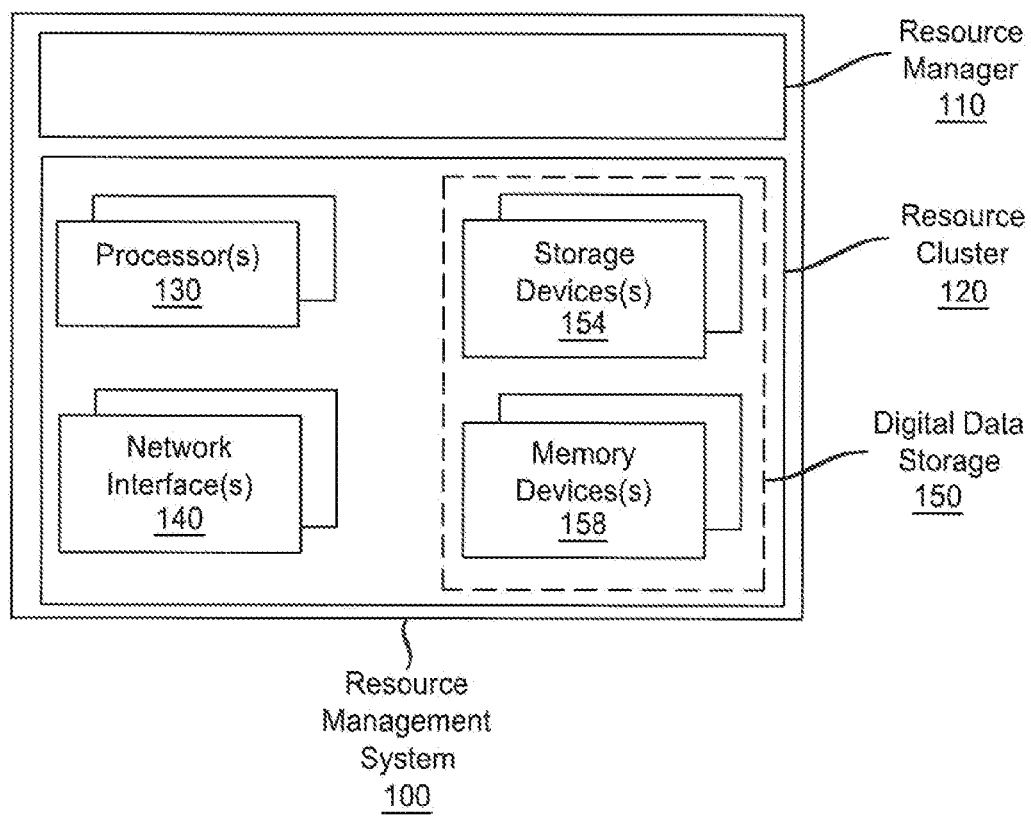
FIG. 1 depicts a block diagram schematically illustrating an embodiment of a resource management system.

FIG. 1 depicts a block diagram schematically illustrating an embodiment of a resource management system 100. The resource management system 100 includes a resource manager 110 which controls the allocation of resources within the resource cluster 120 of the resource management system 100.

The resource manager 110, which is described in further details below, controls the allocation of the resources in the resource cluster 120 to applications.

The resource cluster 120 may contain physical system resources allocated by resource manager 110. Resources may include, e.g., one or more processors 130, one or more network interfaces 140, and digital data storage 150.

The digital data storage 150 may include one or more storage devices 154 and one or more memory devices 158. Storage devices 154 may include any device suitable for storing nonvolatile data. Memory devices 158 may include any device suitable for being accessed as primary storage by the CPU.

In some embodiments, resource manager 110 may be embodied in one or more tangible programs located in the digital data storage 150 and executed by one or more of the processors 130.

In some embodiments, resource manager 110 includes resource templates to determine the assignment of resources in resource cluster 120 to individual applications. Resource templates may be customized for each application, based on classes of applications, and/or they may be based on billing and/or service level agreements. Resource templates may include parameter values relating to any of various types of application resource requirements, such as: CPU cycle (i.e., processor) requirements; network interface requirements; storage usage requirements; and/or memory usage requirements.

CPU requirements may include any suitable parameter or combination of parameters such as: requirements for dedicated processor(s) and/or core(s); time slice (number of ticks of a core available to the application); priority; maximum wait time and/or the like. Network interface requirements may include any suitable parameter or combination of parameters such as: IP addresses; maximum latency; minimum bandwidth; and/or the like. Storage usage requirements may include any suitable parameter or combination of parameters such as: storage size; access speed; and/or the like. Memory usage requirements may include any suitable parameter or combination of parameters such as: access speed; available minimum physical memory and elastic growth; and/or the like.

In some embodiments, the resources within resource cluster 120 may be provided from within a single physical entity such as a server. In other embodiments, the resources within resource cluster 120 may be provided by physically separated entities.

In one embodiment, processors 130 may be a number of blades within one or more racks of equipment, network interfaces 140 may be a number of network interface cards (NICs), storage devices 154 may include a number of external storage devices, and memory devices 158 may be a number of blades within one or more racks of equipment. It should be appreciated that in some embodiments a portion of the resources may provided by devices that are located remotely (e.g., in cloud networking).

In some embodiments, storage devices 154 may be hard disk drives, optical disc drives, flash memory and/or the like.

In some embodiments, memory devices 158 may be random-access memory (RAM), dynamic RAM (DRAM), flash memory and/or the like.

Figure 2:
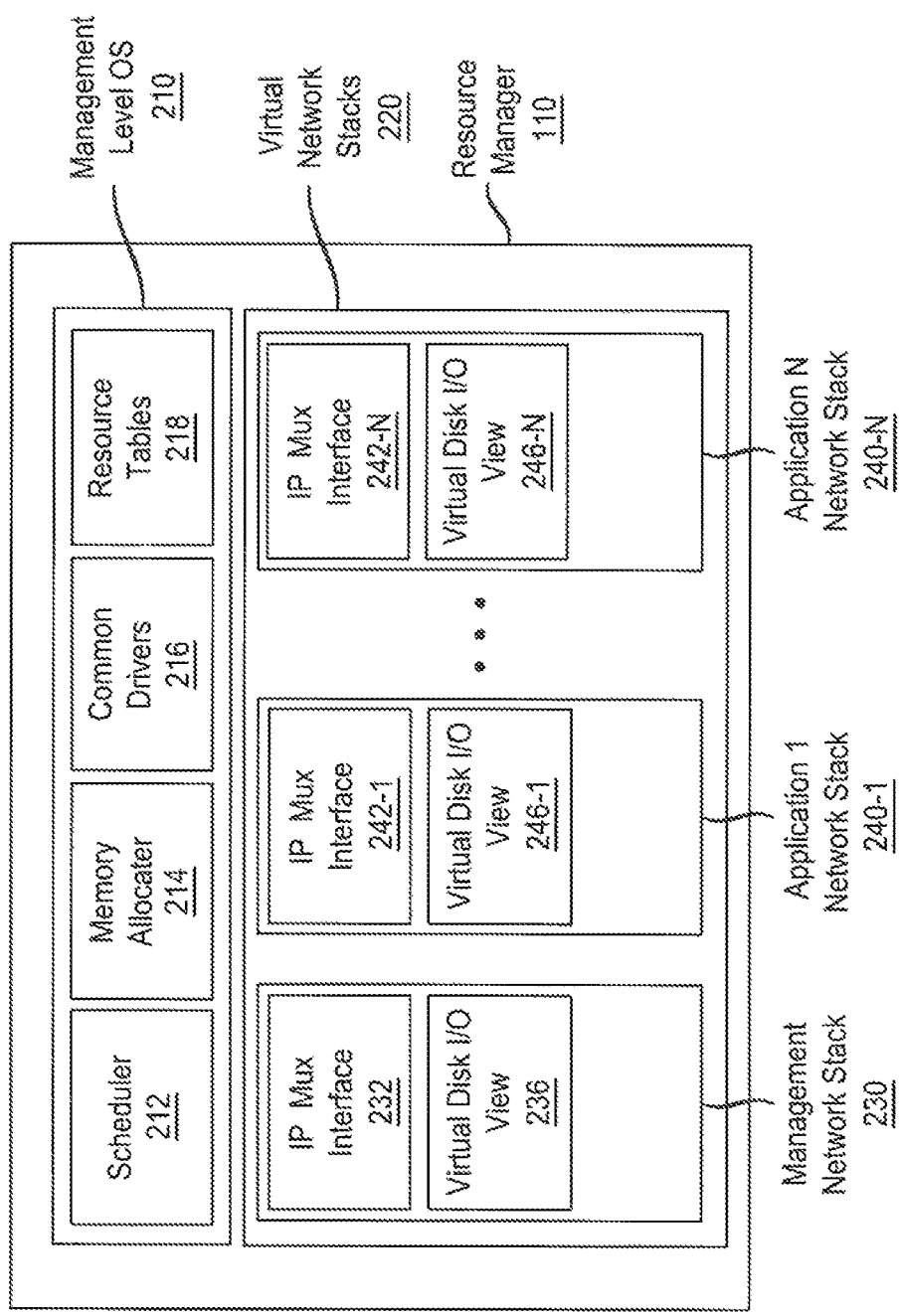
FIG. 2 depicts a block diagram schematically illustrating an embodiment of a resource manager of FIG. 1.

FIG. 2 depicts a block diagram schematically illustrating an embodiment of a resource manager 110 of FIG. 1. The resource manager 110 includes a management level OS 210 which controls the allocation of resources within the resource cluster 120 of FIG. 1 to the operating system and to individual applications. As referred to herein, the collective resources allocated to a given application are the "application isolated virtual space" within which the aforementioned application is performing. Collective resources allocated to an application include both allocated dedicated resources and shared resources (i.e., resources not dedicated to the application). Shared resources may reside in the management level OS 210 whereas separate network stack and I/O facilities will be maintained in the virtual network stacks 220. Advantageously, each application isolated virtual space appears to the outside network as an independent entity, without requiring hardware resources dedicated to each virtual space instance. The term "application" as used herein should be understood broadly as also including services.

The resource manager management level OS 210 includes structures to control the allocation of resources and optionally also includes controllers for shared resources. The application processes are restricted from accessing resources directly. Instead, the management level OS 210 provides an abstraction layer for accessing resources such as I/O devices, file systems and network communication facilities.

Allocation control structures may include control programs (not shown) and resource tables 218. Resource tables are used by control programs to map isolating identifiers to an application's isolated virtual space. Shared resource controllers may include: a scheduler 212, a memory allocator program 214, and common drivers 216. Advantageously, only one OS at the management level is required, but more may be used if desired.

The virtual network stacks 220 include a management network stack 230 and one or more application network stacks 240-1 through 240-N. The management network stack 230 is the management view of the OS provided for the infrastructure operator. Each application network stack 240-1 through 240-N, collectively application network stacks 240, is a unique network stack (IP layer) and a unique virtual I/O layer. Management level OS 210 uses isolating identifiers and resource tables 218 to control an application's access to application network stacks 240.

Each network stack instance is fully independent of all others, so that each instance maintains its own private routing table, set of communication sockets and associated protocol control blocks. Isolating identifiers can be used to limit access to the network stacks so that only an application process operating in that respective application isolated virtual space will have access. Such an arrangement is advantageous because it allows a performance increase and at the same time isolates the application network stacks 240 from each other. It should be appreciated that the application networks stacks 240 may also be assigned unique resources; e.g., each application may be allowed to maintain its own IP addresses and ports.

The scheduler 212 may be created by management level OS 210 to share (e.g., MUX/DEMUX) the use of a single unique resource among the applications vying for access to the resource. Scheduler 212 may include a scheduling algorithm utilized by management level OS 210 to allocate the shared resource among the requesting applications.

The memory allocator 214 may be utilized by management level OS 210 to allocate the available memory (e.g., memory devices 158 of FIG. 1) to applications.

The common drivers 216 may be utilized by management level OS 210 in order to reduce the overhead associated with duplicated drivers. For example, a single Ethernet layer driver in common drivers 216 may provide communications between the MAC (Medium Access Control) and the management level OS 210 and may also provide access to the overlying network layer protocol and the applications layer.

The resources table 218 may be utilized by management level OS 210 to map resources to the application's isolated virtual space using the isolating identifier.

In some embodiments, management level OS 210 creates the conventional network stack and I/O facilities, e.g., management network stack 230, during boot of the OS. For each subsequent visible application booted in this environment requiring an application isolated virtual space, the management level OS 210 creates an application network stack 240-X, wherein "X" denotes one of the application network stacks 240.

In some embodiments, management level OS 210 modifies the behavior of system calls to the kernel by utilizing the isolating identifier to isolate the application from other applications. For example, an application process executing a system call to return all the network devices on the system responds only with the devices (real or pseudo) within its own application isolated virtual space. Thus no other network devices will be used or even seen by the application's processes.

In some embodiments, the Unix/Linux/POSIX GroupID (GID) is the isolating identifier. GID is conventionally used to create groups of users such as a group of students or a department of employees. Since the notion of users and groups is not typically used on servers, GIDs may be utilized by the management level OS 210 to organize a grouping of processes that make up an application. In this way, the management level OS 210 identifies resources in the application isolated virtual space available for use by the application's processes. In some embodiments, the modified system call suppresses the viewing and access of handles and/or names of resources used by other applications.

Advantageously, the management of application network stacks 240 using isolating identifiers allows for significantly less overhead on the data path from applications to the physical network interfaces. It also leads to better utilization of other system resources, particularly CPU and RAM, as compared to conventional OS environments which do not isolate the application network stacks.

In some embodiments, scheduler 212 includes a scheduling algorithm programmed to share CPU processing cycles (e.g., processors 130 of FIG. 1) among applications. It should be appreciated that processors 130 may include one or more processors each of which may contain one or more cores. Scheduler 212 may use a resource template to assign all or portions of core(s) and/or processor(s) to applications. The scheduling algorithm may be any suitable algorithm such as: conventional fairness algorithms and/or conventional priority algorithms. It should be appreciated that core(s) and/or processor(s) may be shared among applications or dedicated to an application. For example, a real time deterministic application may require dedicated core(s) and/or processor(s).

In some embodiments, scheduler 212 may share unassigned and/or underutilized resources among the application processes requesting resources. An underutilized resource is a resource dedicated to an application but not used by the application to the full extent of its allotted portion.

In some embodiments, scheduler 212 may schedule the use of a resource in a first application isolated virtual space using a different scheduling algorithm than used to schedule use of that resource in a second application isolated virtual space.

In some embodiments, memory allocator 214 may utilize the resource table 218 to determine the amount and types of memory allocated to the application. Furthermore, the memory allocator 214 or optionally the resource table 218 may include a memory table to determine the amount and optionally the types of memory already allocated to an application's processes. As such, memory allocator 214 may then determine whether a request from an application's process for memory should be granted.

In some embodiments, memory allocator 214 modifies conventional memory allocation techniques such as the malloc( ) command illustrated in FIG. 3. The memory allocator 214 modifies the conventional malloc( ) system call by utilizing an isolating identifier (e.g., GID) to customize the malloc( ) command to isolate the resources available to the requesting process' application.

For example, referring to FIGS. 3 and 4, and to pseudo code lines (1)-(15) which appear below, an application's process requests a block of memory by using a malloc( ) system call with a size parameter set to the block of memory requested in code line (1). The modified malloc( ) request then determines the amount of memory allocated to the application (e.g., ResouceTable[GID][AllocatedMemory]) and the amount of memory already in use by the application (e.g., MemoryTable[GID][UsedMemory]).

In code line (2), the memory allocator 214 retrieves the processes isolating identifier (e.g., GID).

In code line (3), the memory allocator 214 determines if memory is available to the application by comparing the sum of the memory in use by the application and the size of the requested memory block to the memory allocated to the application.

If the comparison in code line (3) is true, memory is allocated in code line (5) by returning a pointer to the allocated space. In code line (6), the memory allocator 214 determines whether the conventional malloc( ) was successful in allocating the requested memory block. If the conventional malloc( ) was successful, the memory allocator 214 updates the memory table to reflect the updated amount of memory allocated in code line (7). Then successful or not, the malloc( ) returns the pointer to the allocated memory in code line (8).

If the comparison in code line (3) is false, the memory allocator 214 sets the malloc( ) errno to indicate there is insufficient storage to serve the request in code line (12) and returns a null pointer or some other indicator pointer in code line (13).

(1) modified_malloc(size_t size) {
(2) GID=getgid( );
(3) if ((MemoryTable[GID][UsedMemory]+size)≤
ResourceTable[GID] [AllocatedMemory])
(4) {
(5) char *buffer=malloc(size);
(6) if (*buffer !=NULL && errno==0)
(7) MemoryTable[GID][UsedMemory]+=size;
(8) return *buffer;
(9)}
(10) else
(11) {
(12) set errno=ENOMEM;
(13) return NULL POINTER;
(14)}
(15)}

In some embodiments, the resources table 218 is utilized by management level OS 210 to map an isolating identifier to one of the virtual disk I/O views 246. Such mapping limits the application view at the OS system call level to the application's I/O environment. For example, the isolating identifier allows an application to open a socket at a particular IP address/port that is unique even as other applications and/or services running on the same machine open a different IP address on the same port.

In another example, a "path" is mapped to a real i-node, but the path is a custom view for this isolating identifier into the application's virtual Disk I/O View 246-X. Here, "X" denotes one of the application's virtual Disk I/O views. Conventionally, the /dev file system may be used by an application's process to access I/O devices, drivers and other system resources. For example, the /dev file system provides access to a disk driver such as /dev/sda. A conventional OS would typically provide a driver for a hard disk on a linux system. In a similar request that is modified by the isolating identifier, /dev/sda will be an entry into the driver which has knowledge of the application isolated virtual space. The request response will be permitted to include only that subset of cylinders of the disk (or of a virtual disk) which has been allocated to the application isolated virtual space identified by the isolating identifier.

For example, referring to FIGS. 4 and 5, and to pseudo code lines (16)-(20), the modified getcwd( ) request utilizes the isolating identifier to retrieve the current working directory within an application's virtual Disk I/O View 246-X.

In code line (16), an application's process requests the current working directory by using a getcwd( ) system call with a pointer to a character array and the size of the array. In code line (16), the current working directory is retrieved using the conventional getcwd( ) request. Such a request may return the current working directory in a string such as, "/machines/machine1/application1/dir1". The returned string is the system view of the location of the directory within the system I/O view.

In code line (17), the apparatus 214 retrieves the processes' isolating identifier (e.g., GID).

In code line (18), a customized call may be made to convert the system I/O view into a virtual disk I/O view 246. The trim_gidbase( ) routine utilizes the isolating identifier, (e.g., GID), to lookup the base string of the GID application making the request and then trims that base string from the returned current working directory string. For example, if the base of the application referenced by GID was "/machines/machine1", the trim_gidbase( ) call would prune that base from the retrieved working directory string to return the application isolated virtual space virtual disk I/O view "/application1/dir1".

(16) modified_getcwd(char *buf, size_t size) {
(17) getcwd(buf);
(18) GID=getgid( );
(19) trim_gidbase(buf, GID);
(20)}

Similarly, in some embodiments, resources identified by the virtual filesystem "/proc" may be mapped into the application isolated virtual space. Note that "/proc" does not contain 'real' files but instead contains runtime system information (e.g. system memory, devices mounted, hardware configuration, etc). As such, "/proc" may be regarded as a control and information center for the management level OS 210. Moreover, since a number of system utilities are simply calls to files in "/proc", system utilities may be modified to utilize the isolating identifier by altering the files located in the "/proc" directory. For example, 'lsmod' is the same as 'cat /proc/modules' while 'lspci' is a synonym for 'cat /proc/pci'. Similar to the modified getcwd( ) routine, these system utilities may be modified to use the isolating identifier to return information based on the application isolated virtual space view.

Figure 6:
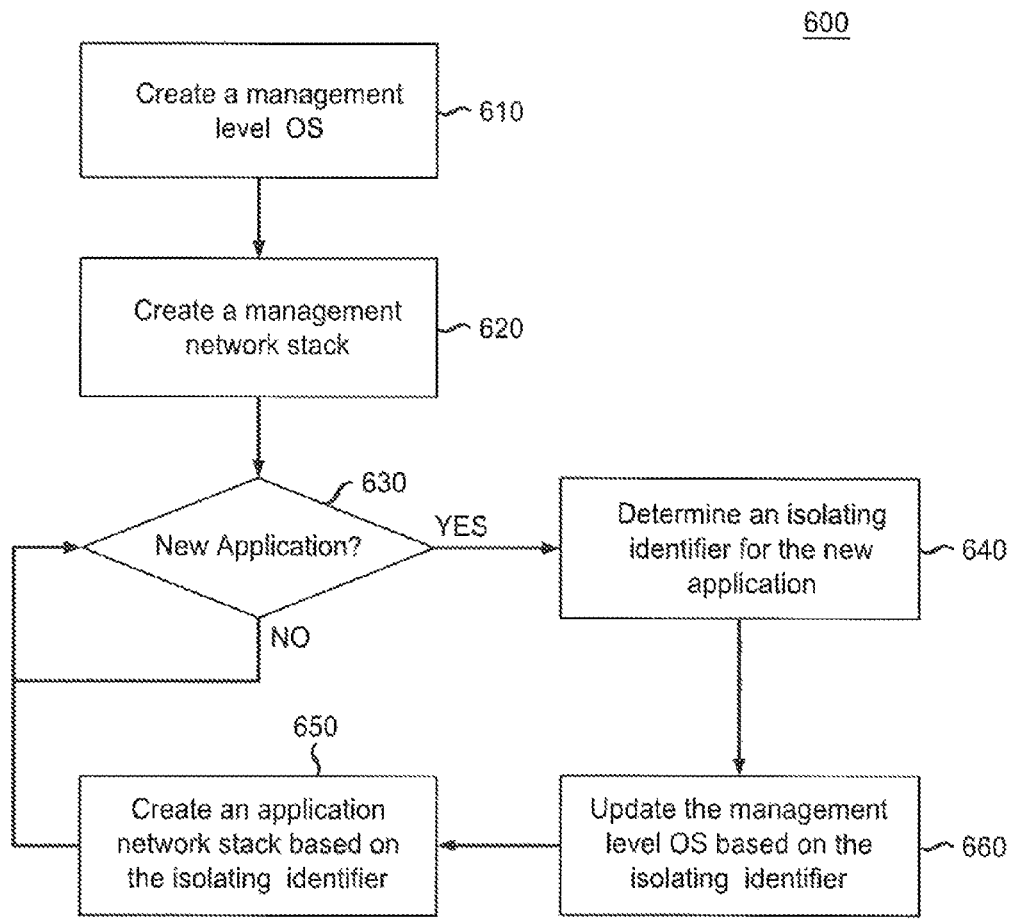
FIG. 6 depicts a flow chart illustrating an embodiment of a method for creating the resource manager of FIG. 2 referring to the functional blocks of FIGS. 2-5.

FIG. 6 depicts a flow chart illustrating an embodiment of a method for creating the resource manager 110 of FIG. 2 referring to the functional blocks of FIGS. 1 and 2. The method 600 includes creating a management level OS, (e.g., step 610) and creating a management network stack, (e.g., step 620). The method 600 also includes monitoring whether an application isolated virtual space should be created for a new application (e.g., step 630). If an application isolated virtual space should be created, the apparatus determines an isolating identifier for the application isolated virtual space (e.g., step 640). The apparatus then updates the management level OS (e.g., step 660) and creates an application network stack (e.g., step 650) based on the isolating identifier. It should be appreciated that some or all of the data structures and programs of the management level OS, management network stack, and application networks stacks may be stored in the digital data storage 150 of FIG. 1.

In the method 600, the step 610 includes creating a management level OS such as the management level OS 210 described in FIGS. 2-5.

In the method 600, the step 620 includes creating a management network stack such as the management network stack 230 described in FIGS. 2-5.

In the method 600, the step 630 includes monitoring whether an application isolated virtual space should be created for a new application. The apparatus management level OS may monitor request for establishing an application virtual space, e.g., from a system hypervisor. If a request is received and the management level OS determines it should grant the request, the method proceeds to step 640. The management level OS may simply accept all requests for establishing an application isolated virtual space or it may determine whether resources are available to be assigned to the application.

In the method 600, the step 640 includes determining an isolating identifier for the new application. The isolating identifier maps resources to an application isolated virtual space as described in connection with FIGS. 2-5. In the method 600, the step 650 includes updating the management level OS based on the isolating identifier. The management level OS uses the isolating identifier to map the resources assigned to the application isolated virtual space as described in connection with FIGS. 2-5.

In the method 600, the step 660 includes creating an application layer network stack based on the isolating identifier. The application layer network stack is mapped to the resource controls of the management level OS using the isolating identifier as described in connection with FIGS. 2-5.

In some embodiments of the method 600, management level OS includes allocation control structures such as described in FIGS. 2-5. For example, the management level OS may include: control programs; resource tables (e.g., resource tables 218 in FIG. 2); a scheduler (e.g., scheduler 212 in FIG. 2); a memory allocator (e.g., memory allocator 214 in FIG. 2); and common drivers (e.g., common drivers 216 in FIG. 2).

In these embodiments, step 660 may include updating the resource tables 218 to map isolating identifiers to resource base names. The updating may also include updating the scheduler 212 to modify the scheduling of CPU cycles within the scheduler algorithm. The updating may also include updating the memory allocator 214. The memory allocator may retrieve the memory allocation parameters from the resource template, confirm that the required memory is available in the memory devices (e.g., memory devices 158 in FIG. 1) and then reset its memory usage parameters to reflect the current memory used by the requesting application.

In some embodiments, step 630 may include determining to run a new instance of an application based on a received request or on an analysis of the application by the resource manager. An application analysis may be a determination whether an application is running slowly. The resource manager may determine an application is running slowly by monitoring the response times for an application against performance thresholds set for that application.

It should be appreciated that in the same manner, a resource manager may stop an under-utilized instance of the application.

Figure 7:
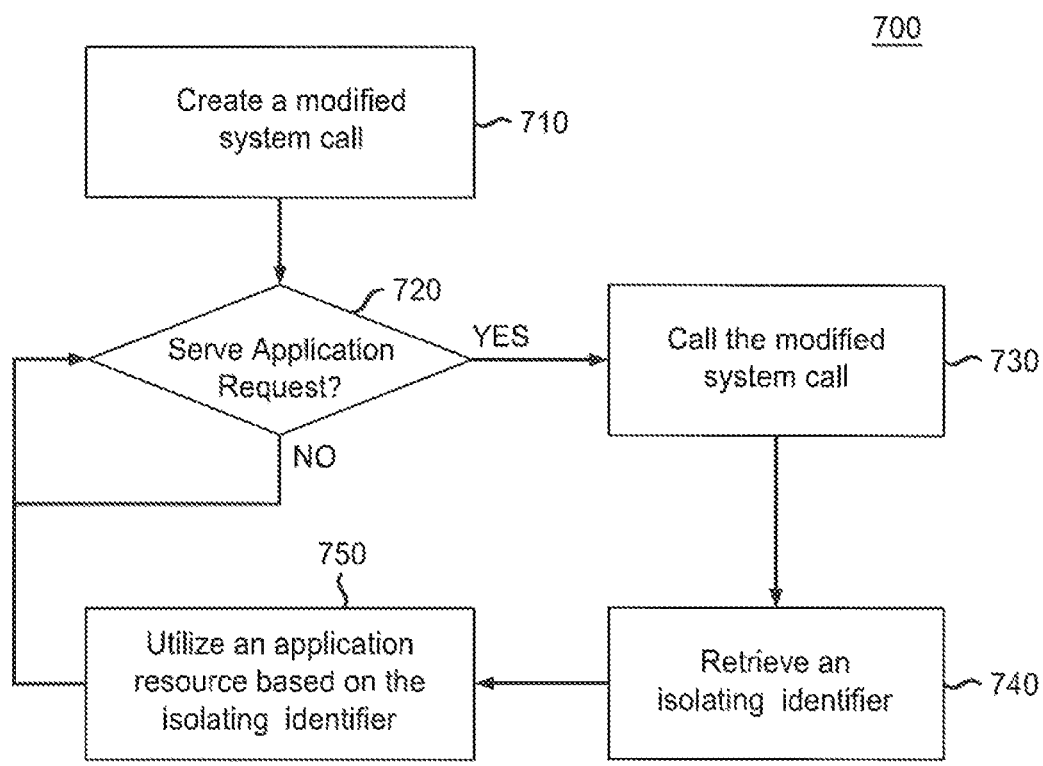
FIG. 7 depicts a flow chart illustrating an embodiment of a method for handling a system call by the resource manager of FIG. 2 referring to the functional blocks of FIGS. 2-5.

FIG. 7 depicts a flow chart illustrating an embodiment of a method for handling a system call by the resource manager 110 of FIG. 2 referring to the functional blocks of FIGS. 1 and 2. The method 700 includes creating a modified system call (step 710). The management level OS will then monitor application requests (step 720), and when a request is received, direct the request to the modified system call (step 730). The modified system call then retrieves the isolating identifier (step 740) and uses the isolating identifier to respond to the applications request based on the application isolated virtual space resources mapped to the application by the isolating identifier.

In the method 700, the step 710 includes creating a modified system call. A conventional system call is modified as described in connection with FIGS. 2-5. The modified system call enables the application to utilize the system call within its application isolated virtual space.

In the method 700, the step 720 includes monitoring application requests to determine when to serve the system call. If the management level OS determines that it should serve the application's request, the method proceeds to step 730.

In the method 700, the step 730 includes calling the modified system call. The modified system call is called as described in connection with FIGS. 2-5.

In the method 700, the step 740 includes retrieving an isolating identifier to be used in the modified system call. The isolating identifier is retrieved as described in connection with FIGS. 2-5. In some embodiments, the isolating identifier may be a part of the system call or retrieved in a modified system call (e.g., using getgid( ). In other embodiments, the isolating identifier may be retrieved based on information in the system call. For example, an IP address/port tuple may be used to identify the application isolated virtual space to which the request belongs. This identification could use the unique IP address/port tuple from a received request to search the resource table (e.g., 218 in FIG. 2) to match the tuple with an isolating identifier.

In the method 700, the step 750 includes utilizing an application resource based on the isolating identifier as described in connection with FIGS. 2-5. As previously described, the apparatus uses the isolating identifier to give the process an isolated view of the system resources. The isolated view of the system resources limits the application's view to only those resources within its application isolated virtual space. In some embodiments, the view may also include unassigned resources if the application would have access to those resources.

In some embodiments of the method 700, step 710 may be optional. For example, the apparatus may use a previously created modified system call. Such previously created modified system call may be stored in digital data storage or provided in program storage devices described below.

Although primarily depicted and described in a particular sequence, it should be appreciated that the steps shown in methods 600 and 700 may be performed in any suitable sequence. Moreover, the steps identified by one box may also be performed in more than one place in the sequence.

It should be appreciated that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

Figure 8:
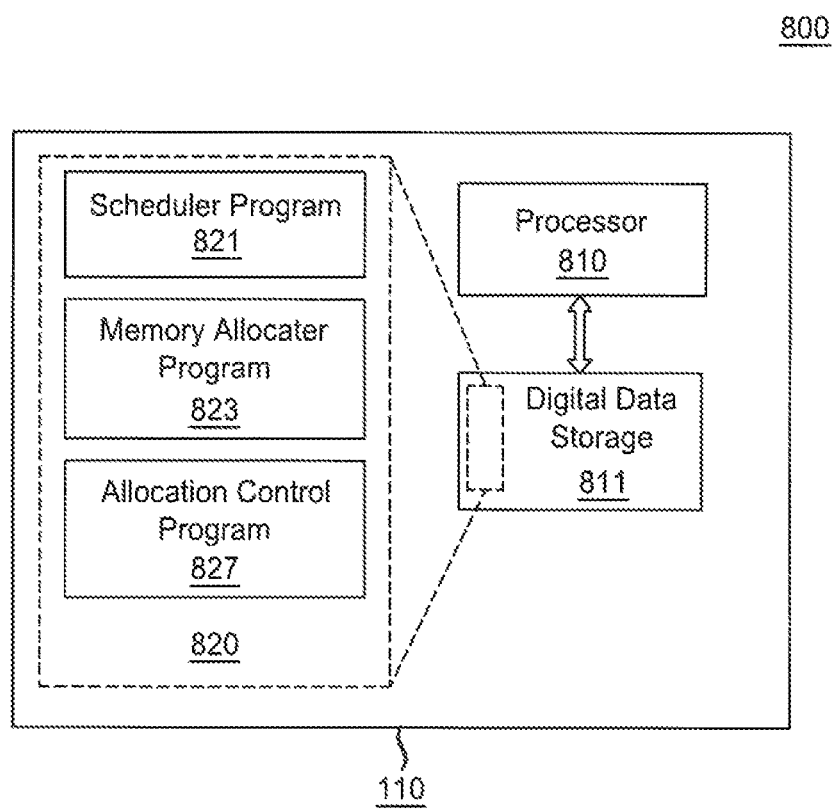
FIG. 8 schematically illustrates blocks of one embodiment of end resource manager 110 of FIG. 1.

FIG. 8 schematically illustrates functional blocks of one embodiment of end resource manager 110 of FIG. 1. Resource manager 110 may manage an application isolated virtual space, e.g., using the methods 600 and/or 700. The resource manager 110 includes a processor 810 and a digital data storage 811.

The processor 810 controls the operation of resource manager 110. The processor 810 cooperates with the digital data storage 811.

The digital data storage 811 stores the common drivers (e.g., common drivers 216 in FIG. 2) and resource tables (e.g., resource tables 218 in FIG. 2). The digital data storage 811 also stores programs 820 executable by the processor 810.

The processor-executable programs 820 may include a scheduler program 821, a memory allocator program 823 and an allocation control program 827. Processor 810 cooperates with processor-executable programs 820 to implement the functionality described in FIGS. 1-7 and/or perform the steps of methods 600 and/or 700.

When processor-executable programs 820 are implemented on a processor 810, the program code segments combine with the processor to provide a unique device that operates analogously to specific logic circuits.

Although depicted and described herein with respect to embodiments in which, for example, programs and logic are stored within the digital data storage and the memory is communicatively connected to the processor, it should be appreciated that such information may be stored in any other suitable manner (e.g., using any suitable number of memories, storages or databases); using any suitable arrangement of memories, storages or databases communicatively coupled to any suitable arrangement of devices; storing information in any suitable combination of memory(s), storage(s) and/or internal or external database(s); or using any suitable number of accessible external memories, storages or databases. As such, the term digital data storage referred to herein is meant to encompass all suitable combinations of memory(s), storage(s), and database(s).

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGS., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated that any block diagrams herein represent conceptual views of illustrative circuitry embodying the principles of the invention. Similarly, it should be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. A method for serving a plurality of system call requests in an application isolated virtual space, comprising:
    at a processor communicatively coupled to a digital data storage, receiving a first system call request;
    retrieving, by the processor in cooperation with the digital data storage, a first isolating identifier based on the first system call request, the first isolating identifier corresponding to a first application isolated virtual space; wherein the first application isolated virtual space comprises a first plurality of resources allocated to the first application; and
    utilizing, by the processor in cooperation with the digital data storage, a first application resource to satisfy a first of the system call requests based on the first isolating identifier; wherein the first plurality of resources comprises the first application resource;
    receiving, by the processor in cooperation with the digital data storage, a second system call request associated with a second application;
    retrieving, by the processor in cooperation with the digital data storage, a second isolating identifier based on the second system call request, the second isolating identifier corresponding to a second application isolated virtual space; wherein the second application isolated virtual space comprises a second plurality of resources allocated to the second application; and
    utilizing, by the processor in cooperation with the digital data storage, a second application resource to satisfy a second of the system call requests based on the second isolating identifier; wherein the second plurality of resources comprises the second application resource.

2. The method of claim 1, wherein the first system call request calls a modified system call.

3. The method of claim 2 wherein the method further comprises: creating the modified system call from a system call.

4. The method of claim 2, wherein the modified system call accesses a virtual disk I/O view.

5. The method of claim 2, wherein the modified system call accesses a shared memory.

6. A system call server apparatus, comprising:
    a digital data storage, the digital data storage including at least one storage device and at least one memory device;
    at least one network interface; and
    at least one processor configured to:
    receive a first system call request associated with a first application;
    retrieve a first isolating identifier based on the first system call request, the first isolating identifier corresponding to a first application isolated virtual space; wherein the first application isolated virtual space comprises a first plurality of resources allocated to the first application; and
    utilize a first application resource to satisfy the first system call request based on the first isolating identifier; wherein the first plurality of resources comprises the first application resource;
    receive a second system call request associated with a second application;
    retrieve a second isolating identifier based on the second system call request, the second isolating identifier corresponding to a second application isolated virtual space; wherein the second application isolated virtual space comprises a second plurality of resources allocated to the second application; and utilize a second application resource to satisfy the second system call request based on the second isolating identifier; wherein the second plurality of resources comprises the second application resource.

7. The apparatus of claim 6, wherein the first system call request calls a modified system call.

8. The apparatus of claim 7, wherein the at least one processor is further configured to: create the modified system call from a system call.

9. The apparatus of claim 8, wherein the modified system call accesses a virtual disk I/O view.

10. The apparatus of claim 8, wherein the modified system call accesses a shared memory.

* * * * *